United States Patent [19]

Rueggeberg

[11] 4,176,267
[45] Nov. 27, 1979

[54] MICROWAVE ENERGY TRAP

[75] Inventor: Werner Rueggeberg, Lancaster, Pa.

[73] Assignee: Armstrong Cork Company, Lancaster, Pa.

[21] Appl. No.: 905,295

[22] Filed: May 12, 1978

[51] Int. Cl.² .............................................. H05B 9/06
[52] U.S. Cl. ....................... 219/10.55 A; 219/10.55 D
[58] Field of Search ............... 219/10.55 A, 10.55 R, 219/10.55 D; 174/35 MS, 35 R, 35 GC

[56] References Cited

U.S. PATENT DOCUMENTS

| 2,868,939 | 1/1959 | Pound | 219/10.55 A |
| 3,048,686 | 8/1962 | Schmidt | 219/10.55 A |
| 3,263,052 | 7/1966 | Jeppson et al. | 219/10.55 A |
| 3,624,335 | 11/1971 | Dench | 219/10.55 A |
| 3,643,054 | 2/1972 | Forster | 219/10.55 A |
| 3,665,141 | 5/1972 | Schiffmann et al. | 219/10.55 A |
| 3,688,068 | 8/1972 | Johnson | 219/10.55 A |
| 3,704,523 | 12/1972 | Guerga et al. | 219/10.55 A |
| 3,749,874 | 7/1973 | Edgar | 219/10.55 A |
| 3,858,022 | 12/1974 | Smith | 219/10.55 A |

Primary Examiner—Arthur T. Grimley

[57] ABSTRACT

A microwave energy trap for use in conjunction with the exit and entrance ports of a conveyorized microwave oven. The energy trap operates to prevent the escape of microwave energy through the ports into the surrounding environment. The energy trap comprises a tunnel having a current suppressing coating, resonant slots communicating through the wall of the tunnel, and waveguide chambers located over the slots for absorbing and dissipating microwave energy.

5 Claims, 3 Drawing Figures

MICROWAVE ENERGY TRAP

BACKGROUND OF THE INVENTION

The present invention relates to apparatuses for treating materials with microwave energy and, more particularly, to energy traps for preventing the escape of microwave energy into the environment from microwave ovens.

The processing of materials by means of microwave energy radiated within an enclosure has become widespread. Microwave oven systems enjoy the advantages of efficiency, fast processing times, low cost, and more uniform heating in the case of lossy dielectric materials. For the purposes of the present discussion, the term microwave refers to electromagnetic energy having wavelengths in the range between one meter and one millimeter or frequencies in excess of 300 megahertz.

To provide for continuous operations, many industrial microwave ovens have been provided with conveyors which carry the material to be treated into, through, and out of the enclosure of the oven. A serious drawback of these continuous flow process systems has been that the access openings to the enclosure can leak considerable microwave energy into the surrounding environment. Such leakage may result in medical detriment to persons in the area and possibly interference with nearby communications services. On account of these hazards, there is a need to provide efficient devices which will reduce the aforementioned leakage.

Various solutions have been proposed to deal with the problem of microwave energy escaping through the access ports of conveyorized microwave ovens. U.S. Pat. No. 2,868,939 to Pound discloses the use of lossy dielectric energy absorbing panels disposed in a vestibule adjoining an access port. The panels are coated with a resistive material and oriented in the plane, or planes, of maximum electric field excitation in the vestibule. This structure is not sufficiently effective to reduce energy leakage to the desired level. U.S. Pat. No. 3,048,686 to Schmidt discloses the use of multiple, adjustable quarterwave blocking filters in tunnels adjacent to the oven access ports. As an extra feature, Schmidt also discloses the use of slots in the tunnel walls apparently for reflection of radiation back into the oven enclosure. This device is complicated and expensive to assemble. U.S. Pat. No. 3,624,335 to Dench discloses slotlike discontinuities in the walls of access tunnels adjoining the entrance and exit ports of a microwave oven. These discontinuities function to reflect microwave energy back into the main oven enclosure. Additionally, Dench disclosed the use of sheets of energy absorbent material enclosing the discontinuities apparently for the purpose of assuring attenuation of escaping energy not adequately reflected by the slots. This structure is effective but still allows unacceptable amounts of microwave energy leakage. U.S. Pat. No. 3,858,022 to Smith discloses an attenuation channel having spaced plates forming passages containing microwave absorbing material and an intermediate section wherein liquid lossy to microwaves is circulated into access with escaping microwave energy. This apparatus is effective but is of such a complicated structure that its cost is prohibitive so as to preclude general use.

SUMMARY OF THE INVENTION

Therefore, it is an object of the present invention to provide an apparatus for use in conjunction with a conveyorized microwave oven which will efficiently prevent the escape of any significant quantities of microwave energy from the oven.

It is a further object of the present invention to provide an apparatus for use in reducing microwave energy leakage which is simple in design, highly effective in use, inexpensive to contruct, and otherwise well adapted to the purposes for which the same is intended.

Accordingly, the present invention provides a microwave energy trap for reducing energy leakage from a microwave oven having access ports and a conveyor means running into and out of the oven enclosure through the access ports. The energy trap comprises a tunnel adjoining and extending out from one of the access ports to the oven. Resonant slots are provided in the walls of the tunnel. Waveguide chambers are located on the outside of the tunnel over of the resonant slots. Microwave energy absorbing materials are disposed inside the waveguide chambers. In operation, microwave energy escaping through the oven access port is directed through the resonant slots into the waveguide chambers as it passes down the tunnel. This energy is then absorbed by the microwave energy absorbing material in the waveguide chambers. Additionally, to further attenuate the microwave energy passing down the tunnel, an energy absorbing coating may be adhered to the inside walls of the tunnel.

DESCRIPTION OF THE PREFERRED EMBODIMENT

Figure 1:
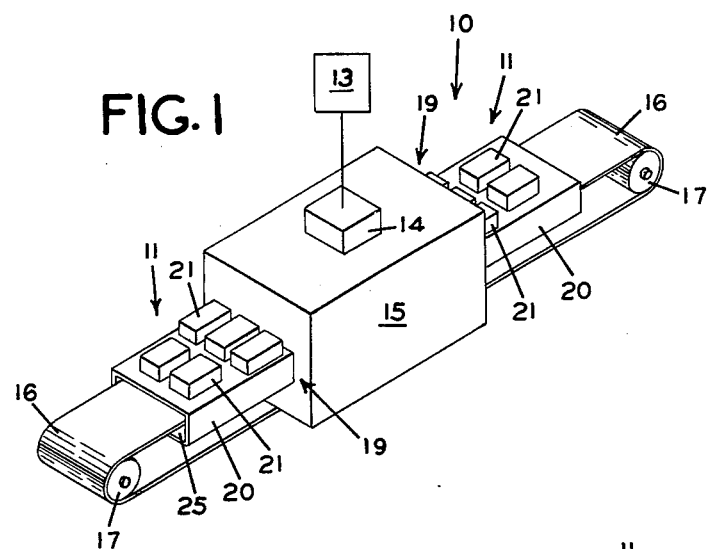
FIG. 1 shows an overall perspective view of an illustrative embodiment of the present invention installed on a conveyorized microwave oven.

Referring now to the figures wherein like reference characters refer to like or corresponding parts throughout the several views, FIG. 1 shows a conveyorized microwave oven 10 including two microwave energy traps 11 of the present invention installed thereon. The microwave oven 10 includes microwave generator 13 which radiates microwave energy down rectangular waveguide section 14 through a suitable aperture into enclosure 15. Microwave generator 13 may be any conventional microwave tube such as a magnetron operating at any suitable frequency. However, for the purposes of this description, generator 13 is preferably operated at 2450 megahertz. The oven enclosure 15 is formed by substantially parallel conductive wall members which provide a confined space in which materials may be treated with microwave energy. Ports 19 are provided at opposite ends of enclosure 15 through which conveyor belt 16 may pass. Conveyor belt 16 runs through the oven enclosure 15 and around rollers 17 providing a means to transport material to be treated through the oven. Belt 16 is comprised of a nonconductive, low dielectric loss material such as plastic which does not absorb microwave energy.

Figure 2:
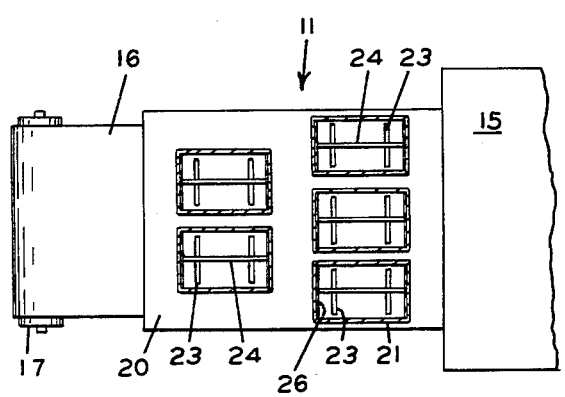
FIG. 2 shows a cross-sectional view of a set of waveguide chambers installed on one tunnel of a conveyorized microwave oven.
Figure 3:
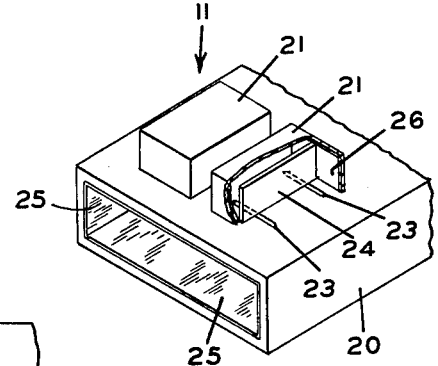
FIG. 3 shows a broken away perspective view of one wave-guide chamber installed on one tunnel of a microwave oven shown without its conveying system.

The microwave energy traps comprise tunnels 20, waveguide chambers 21, energy absorbing materials 24 (see FIGS. 2 and 3), resonant slots 23 (see FIGS. 2 and 3), and energy absorbing tunnel coating 25 (see FIG. 3). The tunnels 20 are open ended rectangular waveguide ducts adjoining ports 19 and enclosing conveyor belt 16 with sufficient extra space to allow the materials to be treated to be transported on the belt. The tunnels 20 confine microwave energy leaking out from ports 19. FIGS. 2 and 3 show resonant slots 23 which communicate through the walls of tunnels 20. Slots 23 are an integral multiple of one-half free space wavelength of the microwave energy long and are of any convenient width approaching one-quarter inch. If the microwave generator 13 operates at 2450 megahertz, then slots 23 may be approximately 2.41 inches long and preferably one-quarter inch wide. Slots 23 may be located on one or more sides of tunnel 20. Slots 23 should be oriented with their long axes approximately perpendicular to the direction of microwave energy propagation in tunnel 20. Slots 23 should preferably be located in a pattern so that any line drawn parallel to the direction of energy propagation in tunnel 20, along the side of the tunnel on which the slots are located, intersects at least two slots. FIG. 2 shows a pattern of slots 23 in four rows and five columns which fulfills the foregoing criterion. Waveguide chambers 21 comprise closed rectangular conductive boxes which are centered over and cover slots 21. The chambers 21 are open on their sides facing tunnel 20 to allow microwave energy to flow from the tunnel through slots 21 into the waveguide chambers. The chambers 21 are preferably dimensioned to cover two slots opposite to one another in the direction transverse to the long axes of the slots. The slots 23 in each waveguide chamber 21 should preferably be spaced 1-2 free space microwave energy wavelengths apart and approximately one-quarter wavelength from the shorter sides of the chamber 21. The waveguide chambers 21 are preferably one-quarter to one-half free space microwave energy wavelengths high and may be just wide enough to completely enclose the slots 23. As shown in FIGS. 2 and 3, chambers 21 contain microwave energy absorbing material 24 comprising a lossy dielectric material. In this illustrative embodiment, material 24 is structured in the form of panels extending longitudinally down the centers of the waveguide chambers from one longitudinal end to the other and from top to bottom. The panel may comprise a plastic plate coated with a film of finely divided conductive material forming an electrically resistive surface or the panel may be formed in bulk from rubber or synthetic material having a filler such as carbon or graphite which provides a high loss factor. Additionally the walls, or especially the ends, of the waveguide chambers 21 may be coated with a layer 26 comprising a lossy dielectric microwave energy absorbing material such as a ceramic ferrite compound disposed within an epoxy vehicle. Further, the inside walls of the tunnel 20 may be coated with a microwave energy absorbing film 25 comprising any of the above described lossy dielectric coatings or other microwave energy absorbing coatings.

In operation, microwave energy leaking from ports 19 is confined to and forced to pass down tunnels 20. The microwave radiation affects corresponding electrical current flows on the inside walls of tunnels 20 as it propagates in the tunnels. These currents and the microwave energy affecting them are attenuated by lossy dielectric film 25 in the tunnels 20. Further, the currents are interrupted by slots 21, which slots on account of their resonant nature radiate the microwave energy into chambers 21. In chambers 21, the microwave energy is rapidly attenuated by microwave energy absorbing material 24 and film 26 which convert the microwave energy into heat.

Various modifications and alterations will readily occur to those skilled in the art without departing from the spirit and scope of the invention as defined in the appended claims. It is intended, therefore, that the embodiment shown and described herein be considered as exemplary only and not in a limiting sense.

I claim:

1. A microwave energy trap for use in conjunction with a microwave oven having a conductive enclosure wherein materials are treated with microwave energy, the enclosure having access ports and a conveyor means passing through the access ports and conductive enclosure, said energy trap comprising:
    (a) a tunnel means with walls enclosing one of the access ports of said oven outside of said enclosure, said conveyor means passing through the tunnel means;
    (b) a plurality of resonant slot means passing through one or more of the walls of said tunnel means;
    (c) a plurality of closed waveguide chamber means disposed on the outside of said tunnel means over said resonant slot means for entrapping microwave energy; and
    (d) a plurality of energy absorbing means disposed within said waveguide chamber means for dissipating microwave energy.

2. The microwave energy trap of claim 1 further including an energy absorbing coating adhered to the inside walls of said tunnel means.

3. The microwave energy trap of claim 1 wherein said energy absorbing means are panels coated with lossy dielectric energy absorbing material and disposed along the central portion of said waveguide chambers.

4. The microwave energy trap of claims 2 or 3 wherein said resonant slot means comprise slots one-half wavelength in length.

5. The microwave energy trap of claims 2 or 3 further including an energy absorbing coating on the inside surfaces of said waveguide chamber means.

* * * * *